United States Patent
Kappa Venkata et al.

(10) Patent No.: US 12,337,727 B2
(45) Date of Patent: Jun. 24, 2025

(54) ACTUATOR CONTROL SYSTEM

(71) Applicant: B/E Aerospace, Inc., Winston-Salem, NC (US)

(72) Inventors: Suresh Babu Kappa Venkata, Bengaluru (IN); Srikanth Annumandla, Hyderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 203 days.

(21) Appl. No.: 18/211,468

(22) Filed: Jun. 19, 2023

(65) Prior Publication Data

US 2024/0017643 A1 Jan. 18, 2024

(30) Foreign Application Priority Data

Jul. 12, 2022 (IN) .............................. 202211039971

(51) Int. Cl.
*B60N 2/02* (2006.01)

(52) U.S. Cl.
CPC ....... *B60N 2/0244* (2013.01); *B60N 2/02246* (2023.08); *B60N 2/02253* (2023.08); *B60N 2/0272* (2023.08)

(58) Field of Classification Search
CPC .............. B60N 2/0244; B60N 2/02246; B60N 2/02253; B60N 2/0272
See application file for complete search history.

(56) References Cited

U.S. PATENT DOCUMENTS

| | | | |
|---|---|---|---|
| 3,246,540 A | 4/1966 | Joseph et al. | |
| 4,044,632 A | 8/1977 | Wildhaber | |
| 5,795,278 A | 8/1998 | Saruwatari et al. | |
| 7,322,710 B2 | 1/2008 | Foote et al. | |
| 9,789,964 B2 | 10/2017 | Garing | |
| 9,993,614 B2 | 6/2018 | Pacheco et al. | |
| 10,450,070 B2 | 10/2019 | Beroth | |
| 10,895,305 B2 | 1/2021 | Dalgord et al. | |
| 11,155,185 B2 | 10/2021 | Rose et al. | |

(Continued)

FOREIGN PATENT DOCUMENTS

| | | |
|---|---|---|
| CN | 210686915 U | 6/2020 |
| CN | 211606314 U | 9/2020 |

(Continued)

OTHER PUBLICATIONS

"What is a Toroidal Transmission", Mar. 23, 2018; www.go4trans.com/technical-transmission-general-articles/what-is-a-toroidal-transmission/.

(Continued)

*Primary Examiner* — Zoheb S Imtiaz (74) *Attorney, Agent, or Firm* — Suiter Swantz IP (57) ABSTRACT

An actuator control system for an assembly including moveable components such as a passenger seat. The system includes a first motor having a first rotating shaft, a second motor having a second rotating shaft, and a plurality of gear assemblies including a gear disposed between the shafts. A controller operates to move each gear independently between a neutral position and a rotationally engaged position with one of the rotating shafts. Each gear is coupled to a flexible shaft rotationally coupled to an actuator for moving the moveable component. In use, a singular controller and the two motors control N number of actuators.

15 Claims, 5 Drawing Sheets

(56) References Cited

U.S. PATENT DOCUMENTS

| | | | |
|---|---|---|---|
| 2001/0003806 A1 | 6/2001 | Swan et al. | |
| 2021/0188134 A1* | 6/2021 | Hudson | B60N 2/2231 |
| 2022/0194595 A1 | 6/2022 | Pevida | |
| 2023/0406168 A1* | 12/2023 | Kato | B60N 2/1842 |

FOREIGN PATENT DOCUMENTS

| | | |
|---|---|---|
| EP | 3301024 A1 | 4/2018 |
| EP | 3385112 A1 | 10/2018 |
| GB | 2497332 A | 6/2013 |
| KR | 100461315 B1 | 12/2004 |
| KR | 20190121670 A | 10/2019 |
| KR | 102239250 B1 | 4/2021 |
| WO | 2012123487 A1 | 9/2012 |

OTHER PUBLICATIONS

Extended European Search Report dated Oct. 20, 2023; European Application No. 23185107.2.

\* cited by examiner

ACTUATOR CONTROL SYSTEM

CROSS-REFERENCE TO RELATED APPLICATION

This application claims the benefit of priority of Indian Provisional Application No. 202211039971 filed Jul. 12, 2022 and entitled "ACTUATOR CONTROL SYSTEM," which is hereby incorporated by reference in its entirety.

TECHNICAL FIELD AND BACKGROUND

The present disclosure relates generally to actuators for positioning moveable components, and more particularly to a system including a singular controller and two-motor and shaft configuration for controlling and driving a plurality of actuators rotationally couplable to the shafts.

Aircraft and other conveyances typically include assemblies having moveable components. For example, aircraft passenger seats may include adjustable backrests, seat pans, legrests, armrests, headrests, etc. While seat adjustability may be limited in economy seating classes due to space and cost constraints, seat adjustability in premium seating classes varies. In some implementations, premium seats may be configured to adjust between upright for taxi, take-off and landing (TTOL) and bed position during flight, with various intermediate seating positions and adjustments therebetween.

Conventional aircraft passenger seat constructions typically include a dedicated controller and motor for each actuator. Some passenger seats capable of complex adjustments may include up to sixteen actuators requiring sixteen motors and sixteen controllers, and in some cases even more. In some seats, linear actuators and rotary actuators are used individually and in combination to change component angles as well as drive component extension and translation. As the number of individual actuators increases so does the number of required motors and controllers, and consequently the complexity, weight, cost and space needed to accommodate and house the components. In aircraft, where weight and serviceability are limiting factors, complexity is particularly undesirable.

Accordingly, what is needed is a system in which a plurality of actuators can be driven and controlled using a minimum number of motors and controllers.

SUMMARY OF THE INVENTIVE ASPECTS

To achieve the foregoing and other advantages, the inventive aspects disclosed herein are broadly directed to actuator control for controlling N number of actuators using a singular controller and two-motor configuration.

According to a first aspect, the present disclosure provides an actuator control system including a first motor having a first rotating shaft, a second motor having a second rotating shaft, and a plurality of gear assemblies each including a gear disposed between the first rotating shaft and the second rotating shaft, each gear independently movable into and out of rotational engagement with one of the first rotating shaft and the second rotating shaft, and each gear coupled to a flexible shaft rotationally coupled to an actuator positioned apart from the gear. A controller is operative to, via for example, PWMs, encoder data, fault signal data, hall sensor data, etc., to control each of the first motor, the second motor, and the plurality of gear assemblies. At least one sensor is configured to sense a condition of the actuator, or moveable component, and output the sensed condition of the actuator or moveable component to the controller for controlling at least one of a rotational direction of the first motor, a rotational direction of the second motor, and a position of each gear relative to at least one of the first rotating shaft and the second rotating shaft. In some embodiments, at least one sensor is associated with each actuator to determine a current position of the actuator in order to determine when to decouple the actuator, via its connection, from a rotating motor shaft.

In some embodiments, each gear is coupled to a common solenoid shaft disposed between a first push-pull linear solenoid assembly positioned proximal to the first rotating shaft and a second push-pull linear solenoid assembly positioned proximal to the second rotating shaft. The first push-pull linear solenoid assembly is operative in an active push mode to push the common solenoid shaft along an axis toward the second rotating shaft to rotationally engage the gear with the second rotating shaft. The second push-pull linear solenoid assembly is operative in an active push mode to push the common solenoid shaft along the axis toward the first rotating shaft to rotationally engage the gear with the first rotating shaft. The first and second push-pull solenoid assemblies are operative in a neutral mode to maintain the gear in a neutral position between and rotationally disengaged from the first and second rotating shafts.

In some embodiments, each of the first and second push-pull linear solenoid assemblies includes a coil electrically coupled to a lead wire configured to energize the coil to actively push the common solenoid shaft in the active push mode and deenergize the coil to position the common solenoid shaft in the neutral position.

In some embodiments, the first rotating shaft and the second rotation shaft are parallel.

In some embodiments, the first rotating shaft is configured to rotate in a first direction and the second rotating shaft is configured to rotate in a second direction opposite the first direction.

In some embodiments, each actuator is coupled to a moveable component.

According to another aspect, the present disclosure provides a passenger seat including a plurality of moveable components each movable by an actuator, and an actuator control system. The actuator control system includes a first motor having a first rotating shaft, a second motor having a second rotating shaft, and a plurality of gear assemblies each including a gear disposed between the first rotating shaft and the second rotating shaft, each gear independently movable into and out of rotational engagement with one of the first rotating shaft and the second rotating shaft, and each gear coupled to a flexible shaft rotationally coupled to the actuator of one of the plurality of moveable components. A controller is communicatively coupled to each of the first motor, the second motor, and the plurality of gear assemblies. At least one sensor is configured to sense a condition of the actuator and output the sensed condition of the actuator to the controller for controlling at least one of a rotational direction of the first motor, a rotational direction of the second motor, and a position of each gear relative to at least one of the first rotating shaft and the second rotating shaft.

In some embodiments, the first rotating shaft and the second rotation shaft are parallel and the first rotating shaft is configured to rotate in a first direction and the second rotating shaft is configured to rotate in a second direction opposite the first direction.

In some embodiments, the first and second motors are positioned under a seat pan of the passenger seat.

In some embodiments, each actuator is a linear actuator or a rotary actuator.

In some embodiments, the plurality of moveable components includes at least two of a backrest, a seat pan, a leg rest, a headrest, and an armrest.

In some embodiments, the controller is configured to, responsive to receiving the output of the sensed condition of the actuator, rotationally engage the gear associated with the actuator to one of the first rotating shaft and the second rotating shaft considering the rotational direction of the first and second rotating shafts.

In some embodiments, the at least one sensor is configured to sense a position of one of the plurality of moveable components and output positional information to the controller, and the controller is configured to act to energize the coil associated with the moveable component to drive the solenoid shaft in the appropriate direction to rotationally engage the respective gear with one of the first and second rotating shafts to change the position of the moveable component.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed to actuator control systems implemented as replaceable units is assemblies including moveable components, for instance an aircraft passenger seat.

Figure 1:
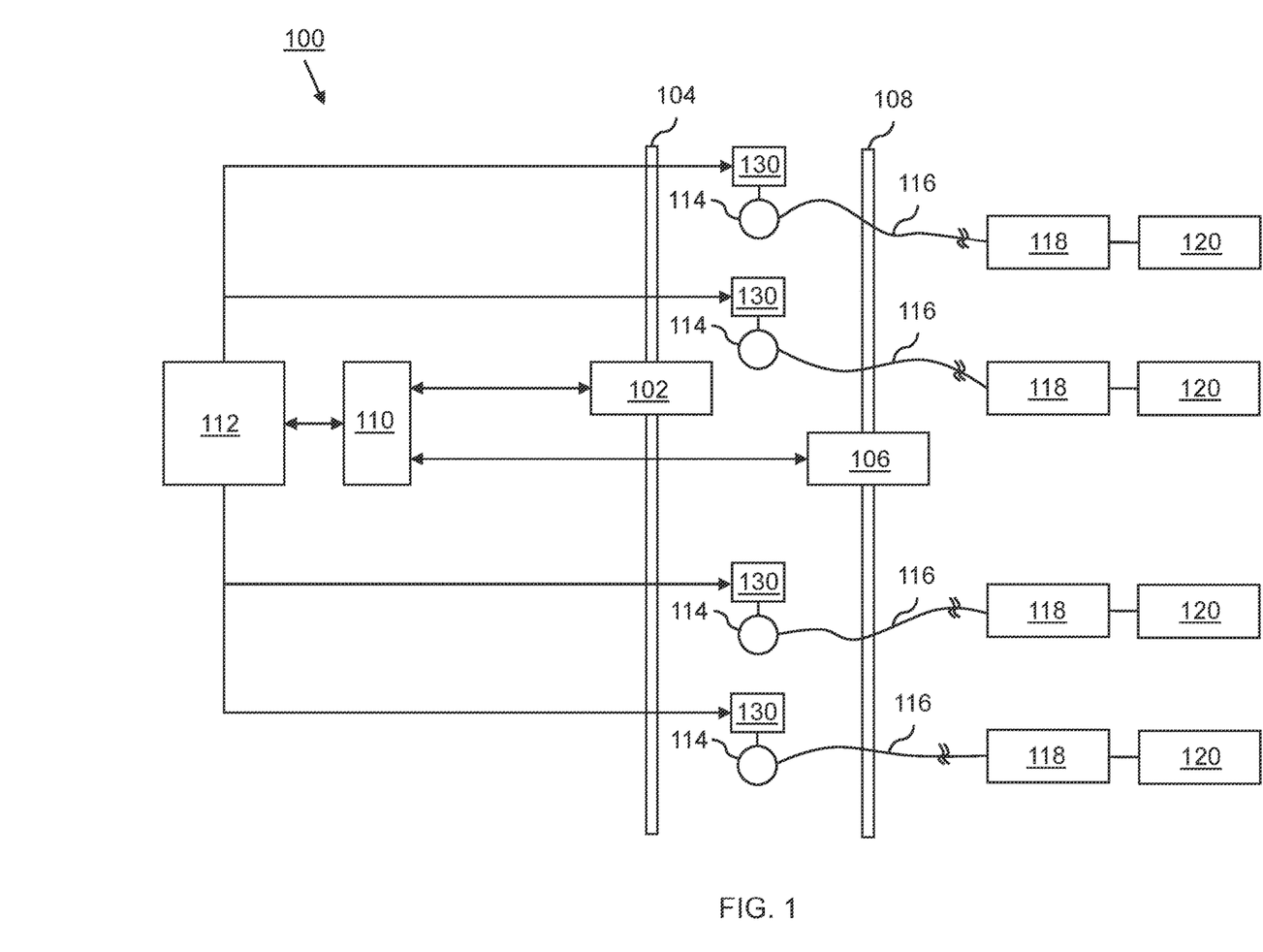
FIG. 1 is a schematic diagram illustrating an actuator control system according to an embodiment of the present disclosure.

FIG. 1 illustrates an actuator control system according to an embodiment of the present disclosure is shown generally at reference numeral 100. Shown schematically, the system 100 generally includes drive assemblies, driven assemblies moveable into and out of engagement with the drive assemblies, and a singular controller operable to control at least each of the drive assemblies and the driven assemblies. Each driven assembly is coupled to a downstream driver coupled to an actuator configured to cause movement of a moveable component. In use, according to sensed conditions output to the controller, the system operates to move the driven assemblies into and out of engagement with the driver assemblies to cause movement of the moveable components. Each of the driver assemblies is moveable in opposing directions, e.g., rotation clockwise or counterclockwise, such that the rotation direction of the driver assemblies is determinative of which driven assembly to engage to cause the desired movement direction. The system is dynamic in that the driven assemblies may be constantly moved into and out of the engagement with the driver assemblies in different pairings and combinations to achieve desired movements in the moveable components.

For purposes of explaining the system architecture, reference is made to system implementation in an aircraft passenger seat to control movements of seat components. For example, an aircraft passenger seat may be equipped with moveable components including, but not limited to, a backrest, a seat pan, armrests, a leg rest, and a headrest. An aircraft passenger seat may be further equipped with lateral and longitudinal adjustment mechanisms. Each of these moveable components and adjustment mechanisms is moveable using an actuator providing linear and/or rotary motion. Component movements may be combination movements or sequential movements caused by two or more actuators acting simultaneously or sequentially. Actuators according to the present disclosure may be located proximal to or distal from their respective moveable components depending on the configuration of the seat.

With continued reference to FIG. 1, the drive assemblies may be motors having rotating shafts. As shown, a first motor 102 is coupled to a first rotating shaft 104 and a second motor 106 is coupled to a second rotating shaft 108. In some embodiments, the first and second rotating shafts 104, 108 are parallel, positioned in relatively close proximity, and for instance under a seat pan of a passenger seat. Each motor 102, 106 may be electrically coupled to a power stage board 110 via a motor drive circuit. Each motor 102, 106 is independently controllable in rotation direction and rotational speed. In some embodiments, the first motor 102 operates to rotate the first rotating shaft 104 in a first rotational direction (e.g., clockwise), and the second motor 106 operates to rotate the second rotating shaft 108 in a second rotational direction opposite the first rotational direction (e.g., counterclockwise). In some embodiments, the first and second shafts 104, 108 may rotate in the same rotational direction but at different speeds. In some embodiments, the first and second shafts 104, 108 may rotate in the same rotational direction and at the same rotational speed.

A controller 112 communicatively coupled to the power stage board 110 (e.g., generally includes, for example, a half-bridged driver, 3-phase bridge inverter, phase current sensor, power management module, and power connection to which an external DC power supply is connected) and operates to energize the first and second motors 102, 106 via the encoder circuit according to conditions discussed further below. The driven assemblies may be gear box assemblies including a gear 114 configured to be moved into and out of contact with each of the first and second rotating shafts 104, 108. As used herein, the term "gear" is used generically to refer to a body configured to be moved by an interaction with the rotating shaft, such as a toothed-gear, toothless gear, pulley, etc. In a neutral position of the gear 114, the gear is disposed between the first and second rotating shafts 104, 108 out of contact with the rotating shafts. In a first active position of the gear 114, the gear is moved into rotational engagement with the first rotating shaft 104. In a second active position of the gear 114, the gear is moved into rotational engagement with the second rotating shaft 108. Gears are moved into and out of rotational engagement with the respective rotating shafts according to instructions from the controller 112 according to the sensed conditions discussed further below.

Each gear 114, or gear assembly, is moved via a gear box 130 and is further coupled to a flexible driven shaft 116. In some embodiments, the flexible driven shaft 116 is driven to impart motion to an actuator 118 coupled to a distal end of the flexible driven shaft 116. In an exemplary implementation, a moveable component may be a moveable seat element (e.g., a backrest) and the flexible driven shaft 116 may be routed from the associated gear to the actuator positioned distal from the gear. In use, rotational engagement of the gear 114 with the respective rotating shaft 104, 108 actuates the flexible driven shaft 116, which in turn actuates the coupled actuator 118 causing movement of the seat element. The rotational direction of the rotating shaft may be determinative of the actuation direction and consequently movement direction of the moveable component (e.g., backrest), which may undergo and angular or/or positional change caused the actuator.

At least one sensor 120 associated with the actuator 118 and/or moveable component senses a condition of the actuator corresponding to a position of the moveable component or position of the moveable component and outputs the sensed condition ultimately to the controller 112, via a wired or wireless communication link (not shown). For example, Hall sensor data from the motor may be output back to the controller 112 via the power stage board 110 to control the motor commutation or rotation, and one position sensor associated with each actuator may indicate the current position of the actuator informing when to decouple the gear from the motor rotating shaft. The controller, communicatively coupled to each of the power stage board 110 and the gearboxes 130, such as also through the power stage board, is configured to determine a relationship needed between one of the rotating shafts 104, 108 and at least one of the gears 114 to achieve a desired interaction to move or reposition the moveable component.

Figure 2A:
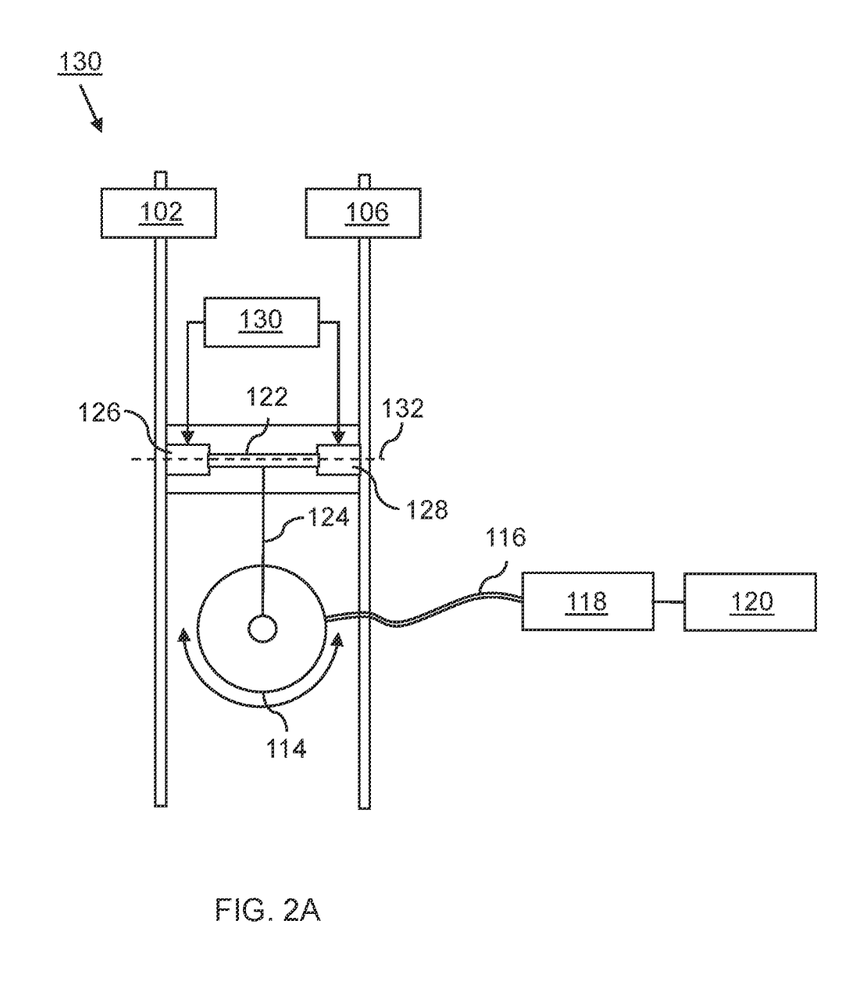
FIG. 2A is a schematic diagram illustrating a gear assembly according to an embodiment of the present disclosure, showing the gear in a neutral position.
Figure 2B:
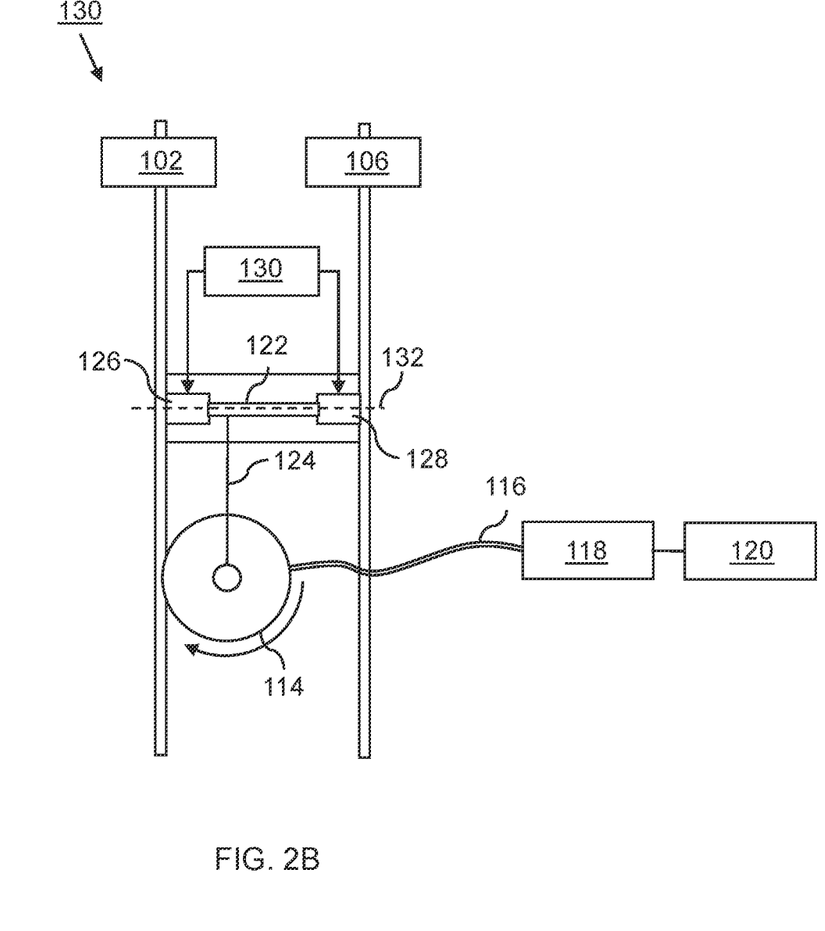
FIG. 2B is a schematic diagram illustrating the gear assembly according to FIG. 2B, showing the gear rotationally coupled with the first rotating shaft.
Figure 2C:
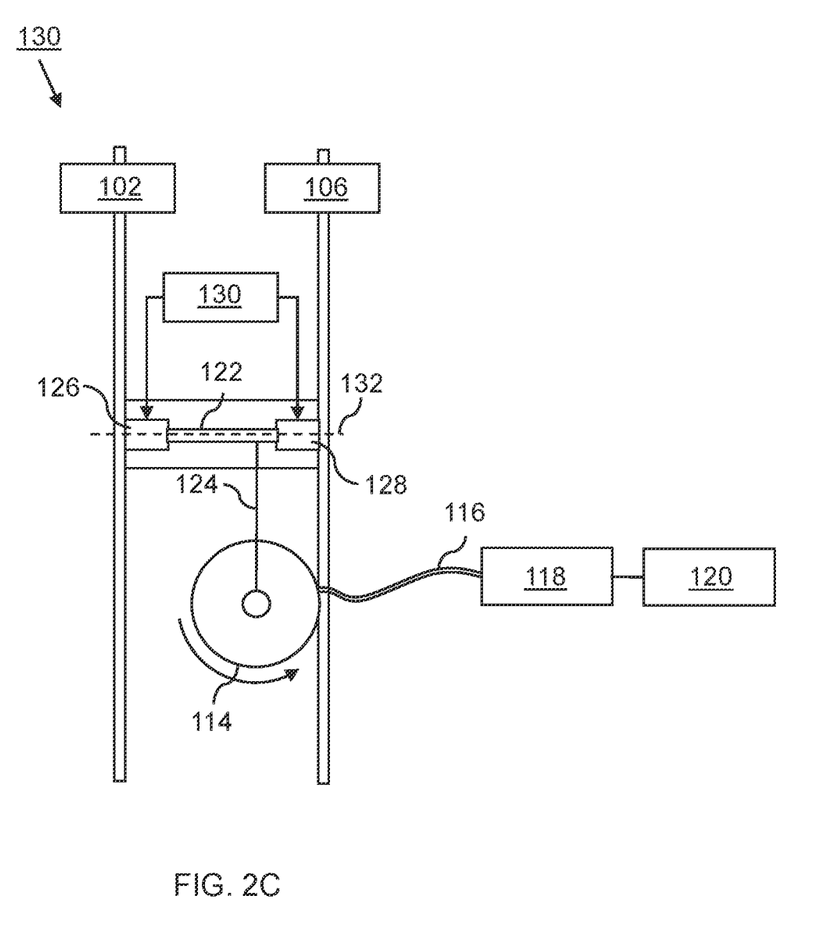
FIG. 2C is a schematic diagram illustrating the gear assembly according to FIG. 2A, showing the gear rotationally coupled with the second rotating shaft.

FIGS. 2A-c illustrate schematically an implementation of a gear box 130 including a push-pull linear solenoid configuration. A common solenoid shaft 122, coupled to a gear shaft 124 about which the gear 114 rotates, moves along an axis 132 to move the gear into and out of engagement with the rotating shafts 104, 108. In some embodiments, the common solenoid shaft 122 is positioned between a first push-pull linear solenoid 126 positioned proximal to the first rotating shaft 104 and a second push-pull linear solenoid 128 positioned proximal to the second rotating shaft 108.

Each of the first and second push-pull linear solenoids 126, 128 may include a coil and biasing member. In operation, energizing the respective coil drives the common solenoid shaft 122 along the axis 132 and deenergizing the coil returns the common solenoid shaft 122 to a neutral position between the rotating shafts. For example, as shown in FIG. 2C, in a first active push mode energizing the first push-pull linear solenoid 126 drives the common solenoid shaft 122 apart from the first push-pull linear solenoid and toward the second push-pull linear solenoid 128, thereby driving the gear 114 into rotational engagement with the second rotating shaft 108. Conversely, as shown in FIG. 2B, in a second active push mode energizing the second push-pull linear solenoid 128 drives the common solenoid shaft 122 apart from the second push-pull linear solenoid and toward the first push-pull linear solenoid 128, thereby driving the gear 114 into rotational engagement with the first rotating shaft 108. As shown in FIG. 2C, deenergizing both the first and second push-pull linear solenoids 126, 128 returns the common solenoid shaft 122 to the neutral position under the forces of the biasing members.

Compared to conventional actuator systems including a dedicated motor and controller for each actuator, N number of actuators can be controlled via N number of gear boxes positioned relative to the rotating shafts 104, 108 via a single controller. In use, initially all the gears may be positioned in their neutral state. When an actuator, or group of actuators are commanded operational in either direction, then based upon the command, either one or both of the rotating shafts will begin rotating in a predetermined rotational direction. The gear(s) of the actuator to be rotated is engaged with the appropriate rotating shaft via the gear box. When a predetermined actuator reaches its configuration destination or has been commanded to stop, the gear is disengaged from the respective shaft.

Figure 3:
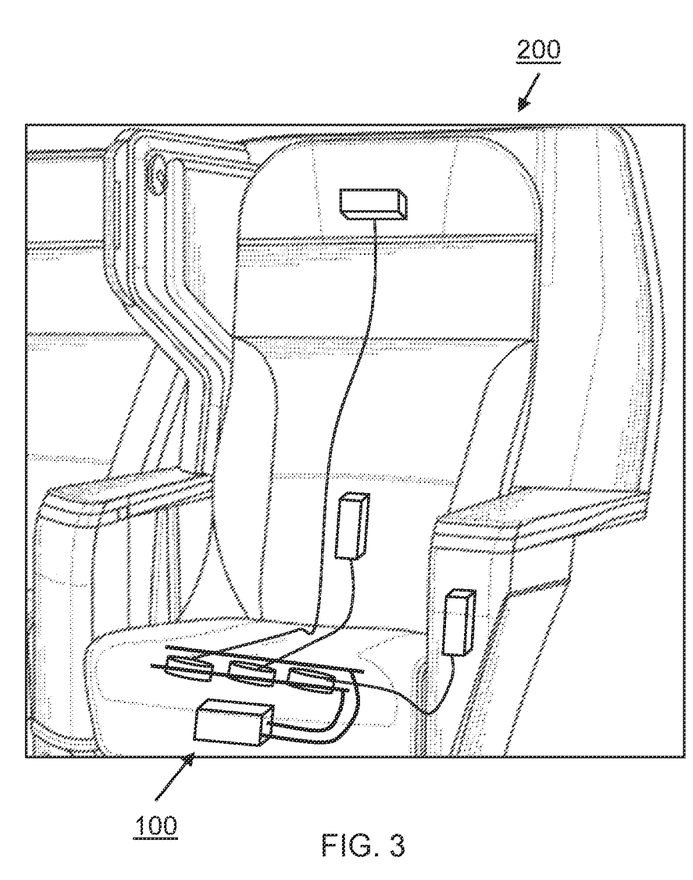
FIG. 3 shows the actuator control system according to the present disclosure implemented as a replaceable unit in an exemplary passenger seat including moveable components.

FIG. 3 illustrates the incorporation of the actuator control system 100 according to the present disclosure in a non-limiting example of a passenger seat platform, for instance a premium class aircraft passenger seat 200. In some embodiments, the controller, motors, rotating shafts, etc. are located under the seat pan and are interconnected to the remote actuators via the individual flexible driving shafts. Moveable seat components may include, but are not limited to, backrests, seat pans, leg rests, armrests, headrests, and lumbar supports. Actuators may be further provided to drive seat translation.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An actuator control system, comprising:
   a first motor having a first rotating shaft;
   a second motor having a second rotating shaft;
   a plurality of gear assemblies each including a gear disposed between the first rotating shaft and the second rotating shaft, each gear independently movable into and out of rotational engagement with one of the first rotating shaft and the second rotating shaft, and each gear coupled to a flexible shaft rotationally coupled to an actuator positioned apart from the gear;
   a controller communicatively coupled to each of the first motor, the second motor, and the plurality of gear assemblies; and
   at least one sensor configured to sense a condition of the actuator and output the sensed condition of the actuator to the controller for controlling at least one of a rotational direction of the first motor, a rotational direction of the second motor, and a position of each gear relative to at least one of the first rotating shaft and the second rotating shaft.

2. The actuator control system according to claim 1, wherein:
   each gear is coupled to a common solenoid shaft disposed between a first push-pull linear solenoid assembly positioned proximal to the first rotating shaft and a second push-pull linear solenoid assembly positioned proximal to the second rotating shaft;
   the first push-pull linear solenoid assembly is operative in an active push mode to push the common solenoid shaft along an axis toward the second rotating shaft to rotationally engage the gear with the second rotating shaft;
   the second push-pull linear solenoid assembly is operative in an active push mode to push the common solenoid shaft along the axis toward the first rotating shaft to rotationally engage the gear with the first rotating shaft; and
   the first and second push-pull solenoid assemblies are operative in a neutral mode to maintain the gear in a neutral position between and rotationally disengaged from the first and second rotating shafts.

3. The actuator control system according to claim 2, wherein each of the first and second push-pull linear solenoid assemblies includes a coil electrically coupled to a lead wire configured to energize the coil to actively push the common solenoid shaft in the active push mode and deenergize the coil to position the common solenoid shaft in the neutral position.

4. The actuator control system according to claim 1, wherein the first rotating shaft and the second rotation shaft are parallel.

5. The actuator control system according to claim 1, wherein the first rotating shaft is configured to rotate in a first direction and the second rotating shaft is configured to rotate in a second direction opposite the first direction.

6. The actuator control system according to claim 1, wherein each actuator is coupled to a moveable component.

7. A passenger seat, comprising:
   a plurality of moveable components each movable by an actuator; and
   an actuator control system, comprising:
      a first motor having a first rotating shaft;
      a second motor having a second rotating shaft;
      a plurality of gear assemblies each including a gear disposed between the first rotating shaft and the second rotating shaft, each gear independently movable into and out of rotational engagement with one of the first rotating shaft and the second rotating shaft, and each gear coupled to a flexible shaft rotationally coupled to the actuator of one of the plurality of moveable components;
      a controller communicatively coupled to each of the first motor, the second motor, and the plurality of gear assemblies; and
      at least one sensor configured to sense a condition of the actuator and output the sensed condition of the actuator to the controller for controlling at least one of a rotational direction of the first motor, a rotational direction of the second motor, and a position of each gear relative to at least one of the first rotating shaft and the second rotating shaft.

8. The passenger seat according to claim 7, wherein:
   each gear is coupled to a common solenoid shaft disposed between a first push-pull linear solenoid assembly positioned proximal to the first rotating shaft and a second push-pull linear solenoid assembly positioned proximal to the second rotating shaft;
   the first push-pull linear solenoid assembly is operative in an active push mode to push the common solenoid shaft along an axis toward the second rotating shaft to rotationally engage the gear with the second rotating shaft;
   the second push-pull linear solenoid assembly is operative in an active push mode to push the common solenoid shaft along the axis toward the first rotating shaft to rotationally engage the gear with the first rotating shaft; and
   the first and second push-pull solenoid assemblies are operative in a neutral mode to maintain the gear in a neutral position between and rotationally disengaged from the first and second rotating shafts.

9. The passenger seat according to claim 8, wherein each of the first and second push-pull linear solenoid assemblies includes a coil electrically coupled to a lead wire configured to energize the coil to actively push the common solenoid shaft in the active push mode and deenergize the coil to position the common solenoid shaft in the neutral position.

10. The passenger seat according to claim 7, wherein the first rotating shaft and the second rotation shaft are parallel and the first rotating shaft is configured to rotate in a first direction and the second rotating shaft is configured to rotate in a second direction opposite the first direction.

11. The passenger seat according to claim 7, wherein the first and second motors are positioned under a seat pan of the passenger seat.

12. The passenger seat according to claim 7, wherein each actuator is a linear actuator or a rotary actuator.

13. The passenger seat according to claim 7, wherein the plurality of moveable components includes at least two of a backrest, a seat pan, a leg rest, a headrest, and an armrest.

14. The passenger seat according to claim 7, wherein the controller is configured to, responsive to receiving the output of the sensed condition of the actuator, rotationally engage the gear associated with the actuator to one of the first rotating shaft and the second rotating shaft considering the rotational direction of the first and second rotating shafts.

15. The passenger seat according to claim 7, wherein the at least one sensor is configured to sense a position of one of the plurality of moveable components and output positional information to the controller, and the controller is configured to act to energize the coil associated with the moveable component to drive the solenoid shaft in the appropriate direction to rotationally engage the respective gear with one of the first and second rotating shafts to change the position of the moveable component.

\* \* \* \* \*